US008283585B2

(12) United States Patent  
Capelli

(10) Patent No.: US 8,283,585 B2
(45) Date of Patent: Oct. 9, 2012

(54) ELECTRIC SWITCHGEAR

(75) Inventor: Fabio Capelli, Capizzone (IT)

(73) Assignee: ABB Technology AG, Zurich (CH)

(*) Notice: Subject to any disclaimer, the term of this patent is extended or adjusted under 35 U.S.C. 154(b) by 267 days.

(21) Appl. No.: 12/727,328

(22) Filed: Mar. 19, 2010

(65) Prior Publication Data

US 2010/0236904 A1    Sep. 23, 2010

(30) Foreign Application Priority Data

Mar. 20, 2009  (EP) .................................. 09155700

(51) Int. Cl.
*H01H 9/20* (2006.01)
(52) U.S. Cl. .................................... 200/50.23
(58) Field of Classification Search ............... 200/50.23, 200/50.24; 361/606, 607
See application file for complete search history.

(56) References Cited

U.S. PATENT DOCUMENTS

| 1,869,856 | A | * | 8/1932 | MacNeil | 361/607 |
| 1,953,822 | A | * | 4/1934 | Reed | 200/50.23 |
| 2,151,756 | A | * | 3/1939 | Fletcher et al. | 200/50.23 |
| 2,735,042 | A | * | 2/1956 | Hayford et al. | 200/50.23 |
| 2,762,879 | A | * | 9/1956 | Wills | 200/50.21 |
| 3,161,804 | A | * | 12/1964 | Guinan | 361/607 |
| 3,213,222 | A | * | 10/1965 | Finley et al. | 200/50.22 |
| 4,216,521 | A | * | 8/1980 | Merola | 361/617 |
| 4,482,936 | A | | 11/1984 | Saito | |
| 5,309,317 | A | * | 5/1994 | Ishikawa | 361/609 |
| 5,450,280 | A | * | 9/1995 | Wactor | 361/606 |
| 5,450,281 | A | * | 9/1995 | Tanaka et al. | 361/611 |
| 7,277,294 | B2 | * | 10/2007 | Carlson | 200/50.2 |

FOREIGN PATENT DOCUMENTS

| EP | 09155700 | 8/2009 |
| GB | 2138635 A | 10/1984 |

OTHER PUBLICATIONS

European Patent Office, Search Report (dated Aug. 11, 2009) in relation to EP Application No. 09155700.9.

* cited by examiner

*Primary Examiner* — Briggitte R Hammond
(74) *Attorney, Agent, or Firm* — Paul R. Katterle; Robert P. Nupp

(57) ABSTRACT

Electric switchgear comprising a casing having at least one compartment provided with a door, a plurality of electrical conductors suitable to be connected to a load, a multi-phase switching device which is mounted on a truck movable inside the compartment between a connected position wherein each phase of the switching device is electrically connected to a corresponding electrical conductor and a withdrawn position wherein each phase of the switching device is electrically separated from the corresponding electrical conductor, and an earthing switch comprising a plurality of contacts for connecting to earth the plurality of electrical conductors. The earthing switch is actuated to move between a first position wherein each contact is electrically connected to a corresponding electrical conductor and a second position wherein each contact is electrically separated from the corresponding electrical conductor by the movement of the truck between the connected position and the withdrawn position.

16 Claims, 17 Drawing Sheets

ELECTRIC SWITCHGEAR

CROSS-REFERENCE TO RELATED APPLICATION

This application claims priority under 35 U.S.C. §119(a)-(d) to European Patent Application Serial Number 09155700.9, filed on Mar. 20, 2009, the entire contents of which are hereby incorporated by reference.

BACKGROUND OF THE INVENTION

The present invention relates to an electric switchgear, which can be also indicated with the equivalent terms of electric panel, or electric switchboard, or similar definitions.

The switchgear according to the present invention is particularly suitable for applications as a motor control center (MCC), preferably for medium voltage applications, i.e. for applications having a nominal voltage ranging between 1 kV and one or more tens of kV; hence, a particular reference to this application will be hereinafter made, without intending in any way to limit its possible further applications.

Medium voltage switchgear or panels are well known in the art and they usually comprise a casing that is internally divided into several compartments housing various apparatuses and equipment. For example, one compartment houses a switching unit, such as a withdrawable multi-phase contactor or circuit breaker; a second compartment houses main cables, such as bus-bars, feeding power from an electrical source; a further compartment houses a system of cables suitable to be connected to a load, typically an electric motor in case of a MCC; further, an earthing switch is usually provided for connecting to ground potential the system of cables connected to the load when the switching unit is electrically separated from the power feeding cables. Depending on the applications, switchgear may comprise other components, such as current transformers, voltage transformers, et cetera.

At present there are available on the market several types of switchgear which are required to satisfy some basic requirements, such as for example offering an excellent reliability, having a sturdy and simplified structure with an overall size as much as possible reduced, ensuring a high level of safety during working operations and maintenance interventions, et cetera.

Although known switchgear perform in a rather satisfying manner, there is still room for further improvements; for example, one usual drawback of actual switchgear resides in the fact that the main electrical components, i.e. the switching unit (be it a circuit breaker or a contactor) and the earthing switch are actuated substantially independent from each other and require dedicated manual or motor-operated actuation systems with a consequent increase of complexity of the panel, as well as manufacturing and installation costs thereof.

Therefore, it would be desirable to provide electric switchgear having an improved structure compared to known switchgear, and in particular, having an improved earthing switch with easy operation and with a reduced number of components, thereby reducing manufacturing and installation costs. The present invention is directed toward such an improved switchgear.

SUMMARY OF THE INVENTION

In accordance with the present invention, an electric switchgear is provided having a casing, electrical conductors, a multi-phase switching device and an earthing switch. The casing includes at least one compartment provided with a door. The electrical conductors are adapted for connection to a load. The multi-phase switching device is mounted on a truck movable inside the compartment between a connected position, wherein each phase of the switching device is electrically connected to a corresponding electrical conductor, and a withdrawn position, wherein each phase of the switching device is electrically separated from the corresponding electrical conductor. The earthing switch has a plurality of contacts for connecting the electrical conductors to earth. The earthing switch is movable between a first position, wherein each contact is electrically connected to a corresponding electrical conductor, and a second position, wherein each contact is electrically separated from the corresponding electrical conductor. The earthing switch is actuated to move between the first and second positions by the movement of the truck between the connected position and the withdrawn position.

The movable truck may have a shaped body adapted for directly actuating the earthing switch when the truck moves from the connected position to the withdrawn position, and vice versa.

The switchgear according to the invention may also have a mechanism adapted for stopping the switching device in a position intermediate between the connected position and the withdrawn position.

Advantageously, the switchgear according to the invention may include a locking mechanism adapted for keeping the door of the compartment closed when the truck moves, together with the switching device, from the connected position to the withdrawn position, and vice versa.

The switchgear according to the invention may also include a shutter for electrically segregating, when operatively needed, the switching device from an associated set of power feeding conductors. The shutter is actuated by the movement of the truck so as to move between a first position, wherein each phase of the switching device is electrically connected to a corresponding power feeding conductor, and a second position, wherein the shutter is positioned between and electrically shields each phase of the switching device from the corresponding power feeding conductor.

BRIEF DESCRIPTION OF THE DRAWINGS

Further characteristics and advantages of the invention will emerge from the description of exemplary, but not exclusive embodiments of the switchgear according to the invention, non-limiting examples of which are provided in the attached drawings, wherein.

DETAILED DESCRIPTION OF ILLUSTRATIVE EMBODIMENTS

Figure 1:
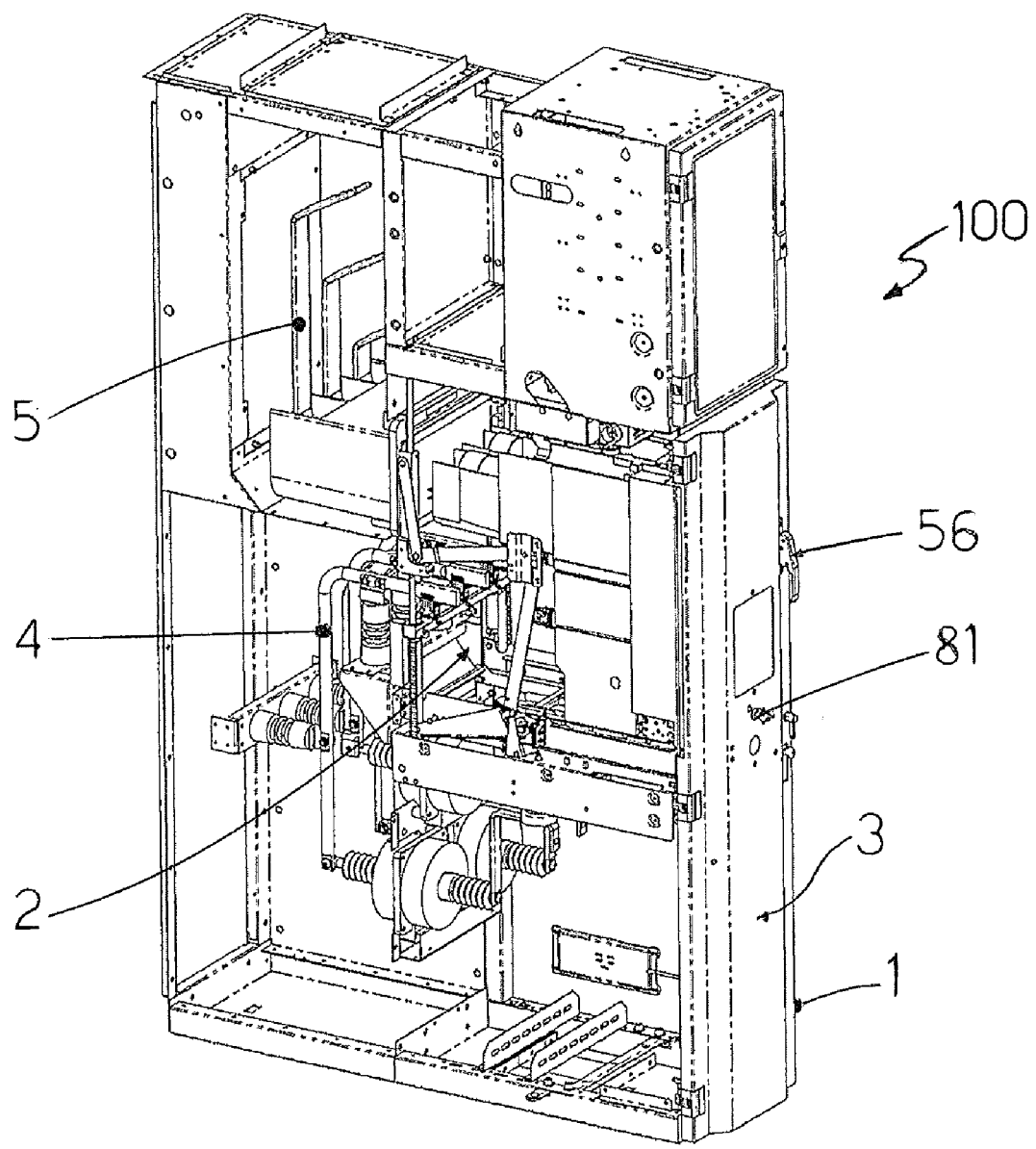
FIG. 1 is a perspective view showing a possible embodiment of a switchgear according to the invention.

FIG. 1 shows an example of an electric switchgear according to the invention, indicated by the overall numeral reference 100, and represented in a preferred constructive embodiment, i.e. as a medium voltage motor control center (MCC).

Figure 2:
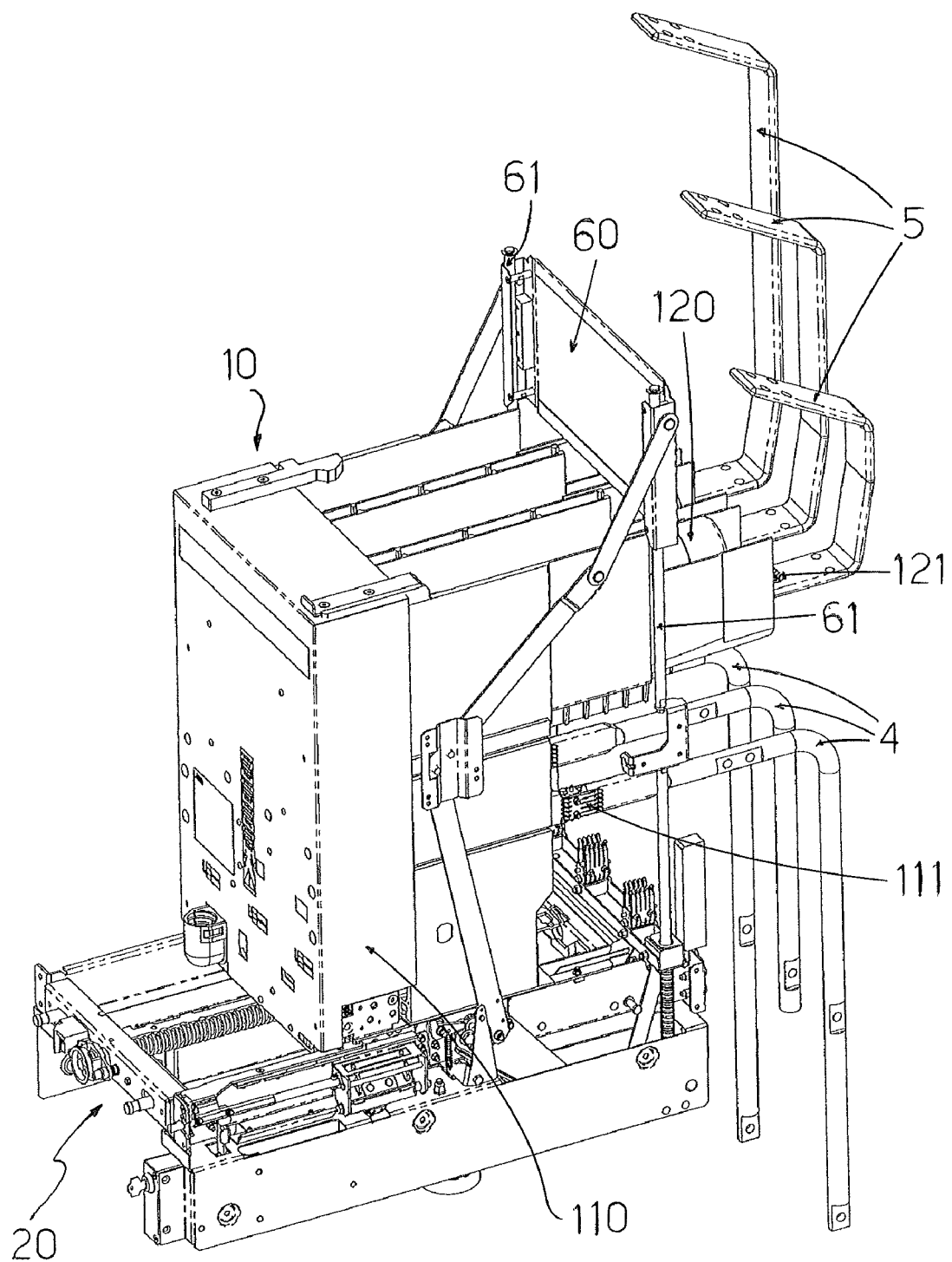
FIG. 2 is a perspective view illustrating in particular a shutter, an earthing switch and an assembly truck-switching device used in the switchgear according to the invention with the switching device in the connected position.
Figure 3:
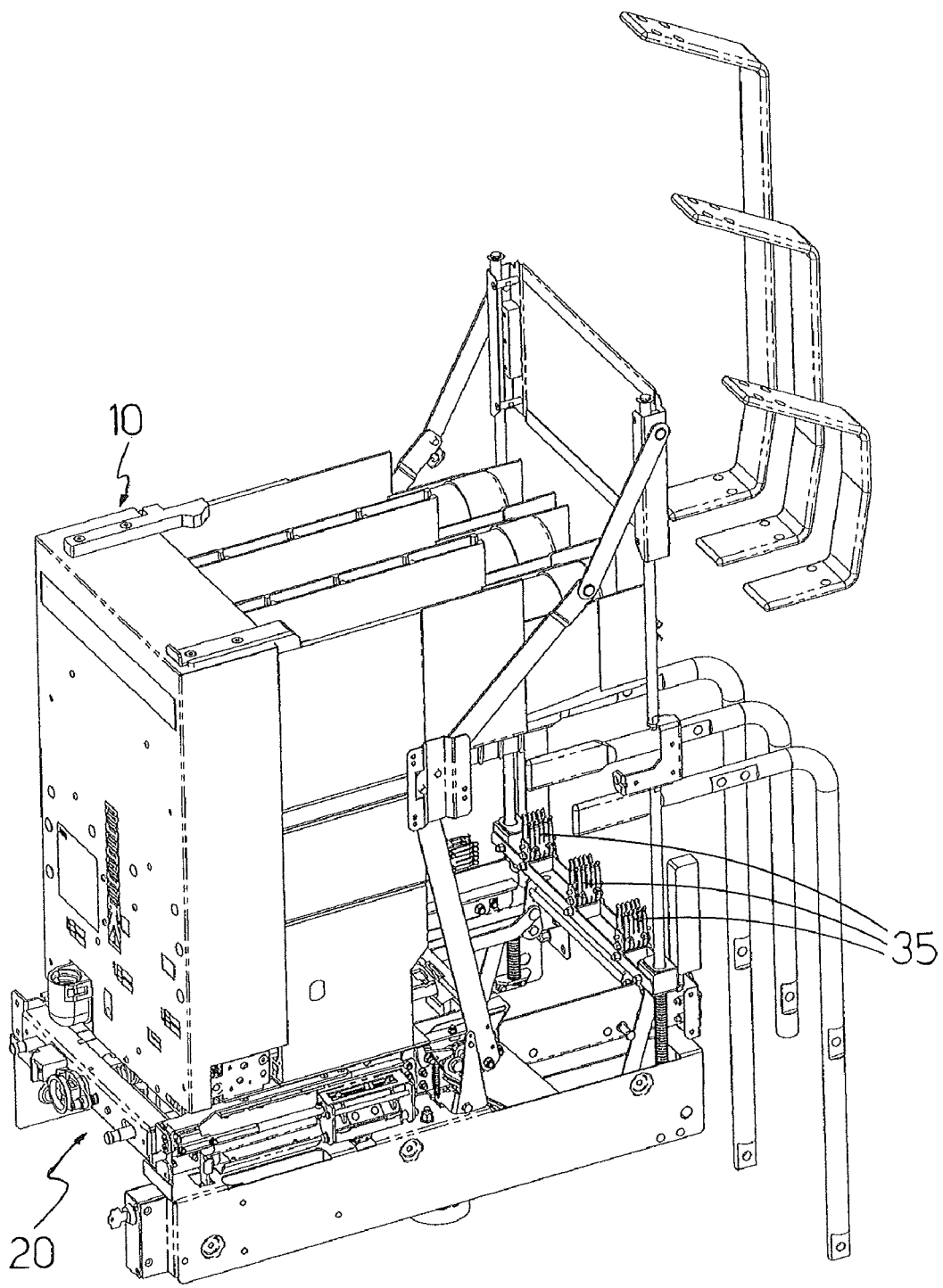
FIG. 3 is a perspective view illustrating the components of FIG. 2 when the switching device is in an intermediate position.
Figure 4:
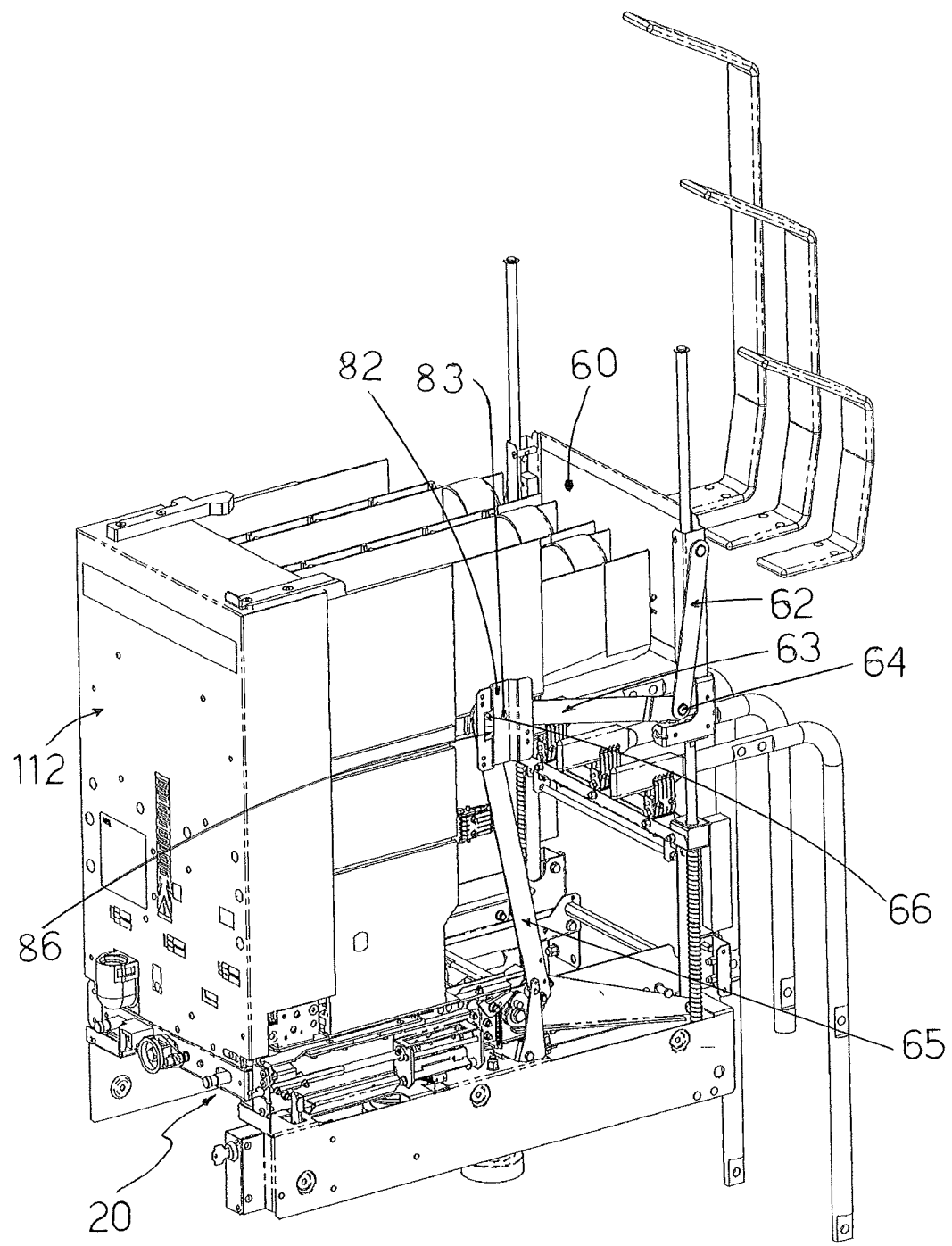
FIG. 4 is a perspective view illustrating the components of FIG. 2 when the switching device is in the withdrawn position.

As illustrated, the switchgear or MCC 100 comprises a casing 1 having at least one compartment 2 provided with a door 3 for opening/closing the compartment 2; inside the compartment 2 there is provided a multi-phase switching device 10, preferably a withdrawable switching device, which is mounted on a movable truck 20, as illustrated in FIGS. 2-4.

According to a preferred embodiment, the switching device 10 comprises at least a current interruption device, preferably a multi-phase vacuum contactor 110, each phase of which is associated and electrically connected to a corresponding electric fuse 120; as known, each phase of the vacuum contactor comprises a couple of main contacts which can be electrically coupled to or separated from each other.

In the embodiment illustrated, the switching device 10 is a three-phase switching device, however, according to the applications, it is possible to have a different number of phases; in addition, a different current interruption device can be used, e.g. a circuit breaker can replace only the vacuum contactor 110, or both the vacuum contactor 110 and the electric fuse 120.

Further, the illustrated vacuum contactor 110, as well as the associated fuses 120, can be constituted by any known type already available on the market and suitable for this application, and since their constructive layouts do not have any particular impact on the peculiar aspects of the present invention, they will not be described in details hereinafter; one example of a possible vacuum contactor is that marketed by ABB group under the commercial name "VSC".

Each phase of the switching device 10 is suitable to be connected in input and output to two sets of electric conductors indicated in the figures by the reference numbers 4 and 5, respectively. As illustrated in FIGS. 2-4, each phase of the switching device 10—and in particular according to the embodiment illustrated—each fuse 120 is provided with a connection contact 121 which is suitable to be connected to an associated power feeding conductor 5; the various power feeding conductors 5 are suitable for instance to be connected to a power feeding source, such as a power line.

In turn, each phase of the vacuum contactor 110 is provided with a further connection contact 111 which is suitable to be connected in output to a corresponding electrical conductor 4 of a plurality of conductors 4; the various conductors 4 are suitable to be connected to and feed a load such as an electric motor.

As it will be appreciated by those skilled in the art, the conductors 4 or 5 can be constituted by any suitable type of conductors, such as bus-bars or cables or equivalent conductive elements; in addition, depending on the applications, also the switching device 10 may be constituted by any suitable switching device, such as for instance a withdrawable circuit breaker.

As above mentioned, the multi-phase switching device 10 is mounted on—and preferably solidly with—a truck 20 so that the truck 20 and the switching device 10 move together like a unique component; in particular, the truck 20 is positioned inside the compartment 2 so as to be movable, preferably to slide, in the manner and the purpose which will described in more details hereinafter, between a first position (hereinafter referred to as a "connected position") wherein each phase of the switching device 10 is electrically connected to a corresponding electrical conductor 4 (and to a power feeding conductor 5 as well) and a second withdrawn position (hereinafter referred to as a "withdrawn position") wherein each phase of the switching device 10 is electrically separated from the corresponding electrical conductor 4 (and from the corresponding power feeding conductor 5 as well).

Figure 7:
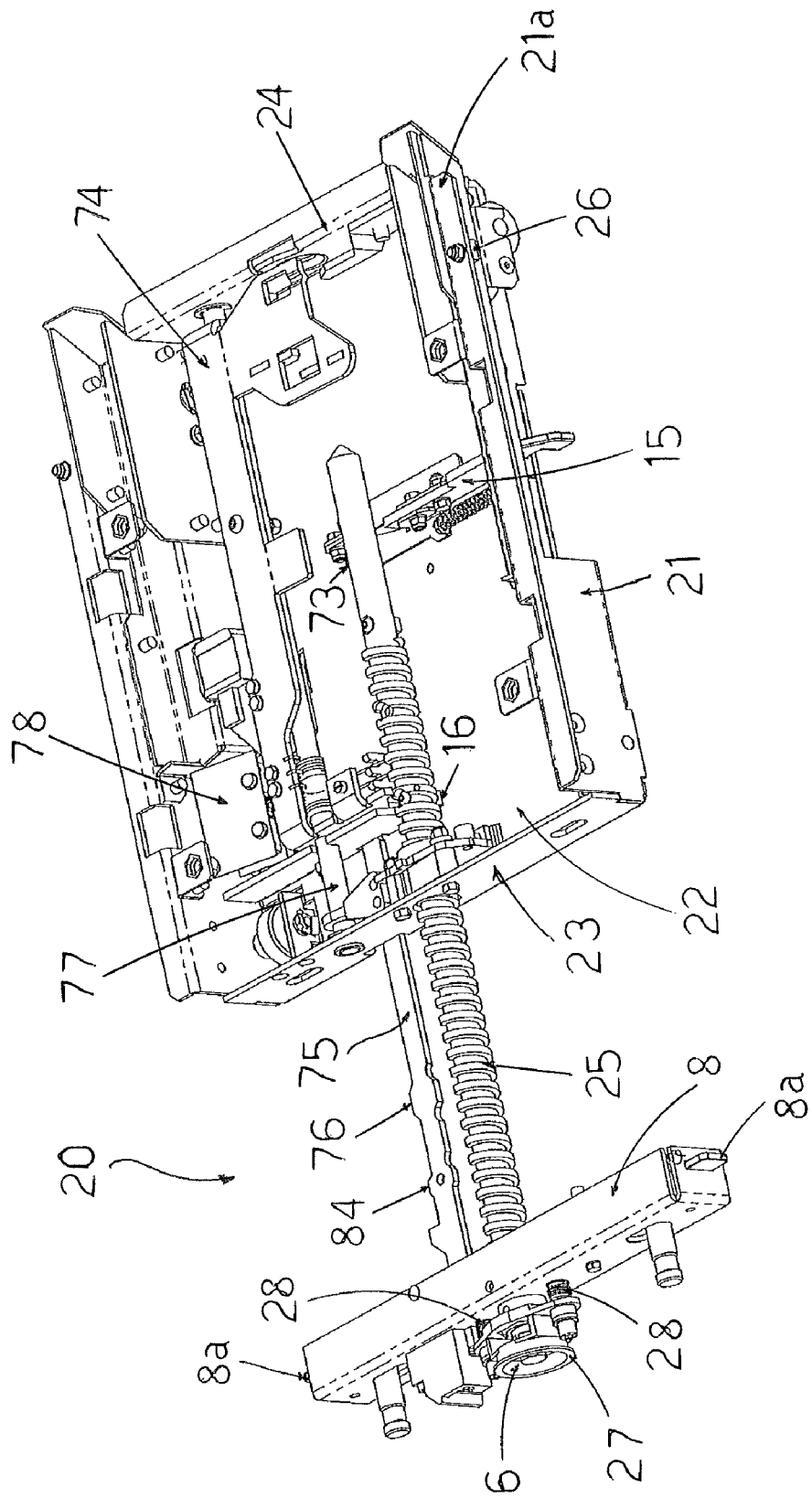
FIG. 7 is a perspective view illustrating the truck and some components of a stopping mechanism used in the switchgear according to the invention in a position corresponding to that of FIG. 2.
Figure 8:
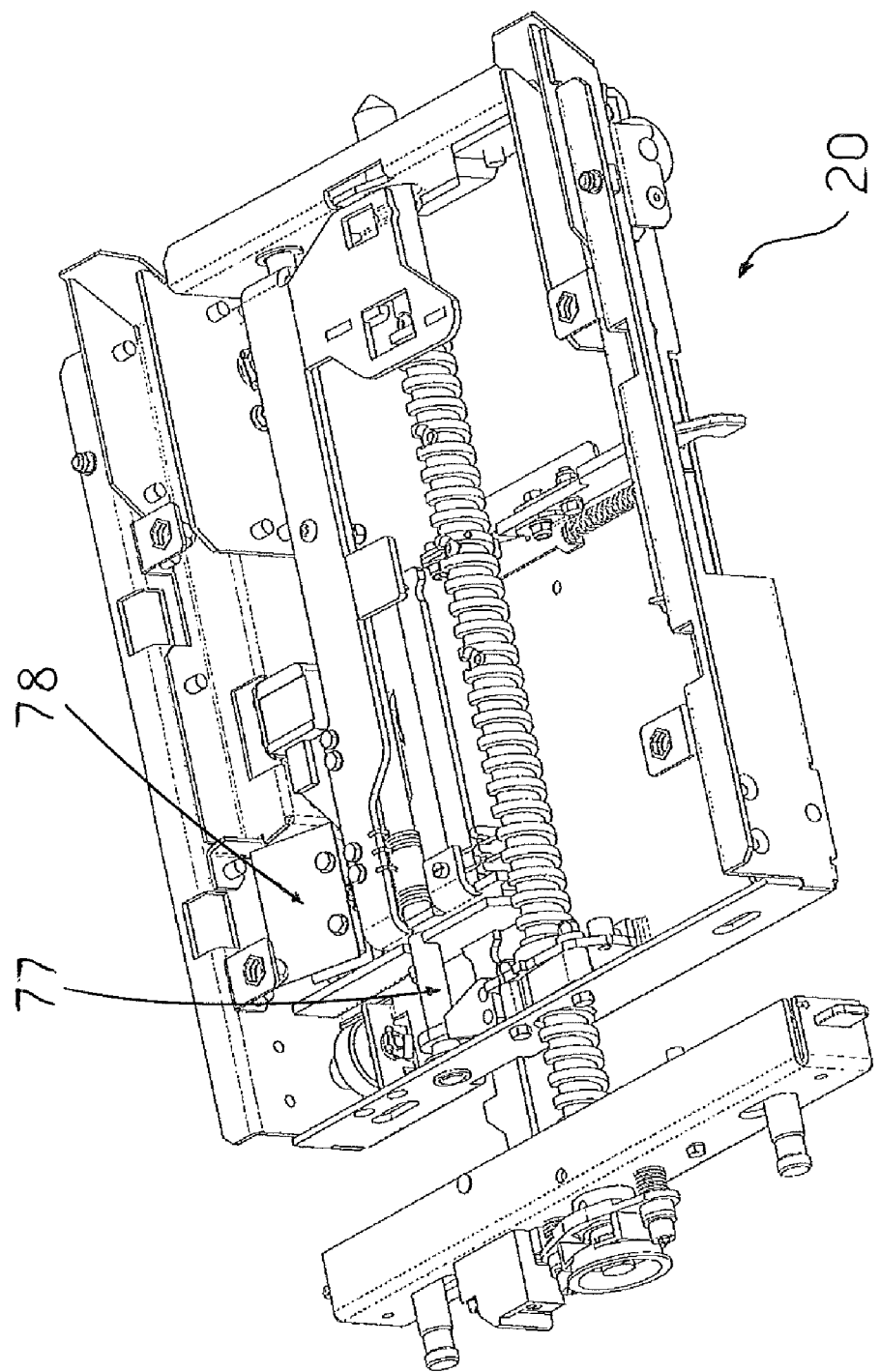
FIG. 8 is a perspective view illustrating the truck and some components of the stopping mechanism in a position corresponding to that of FIG. 3.
Figure 9:
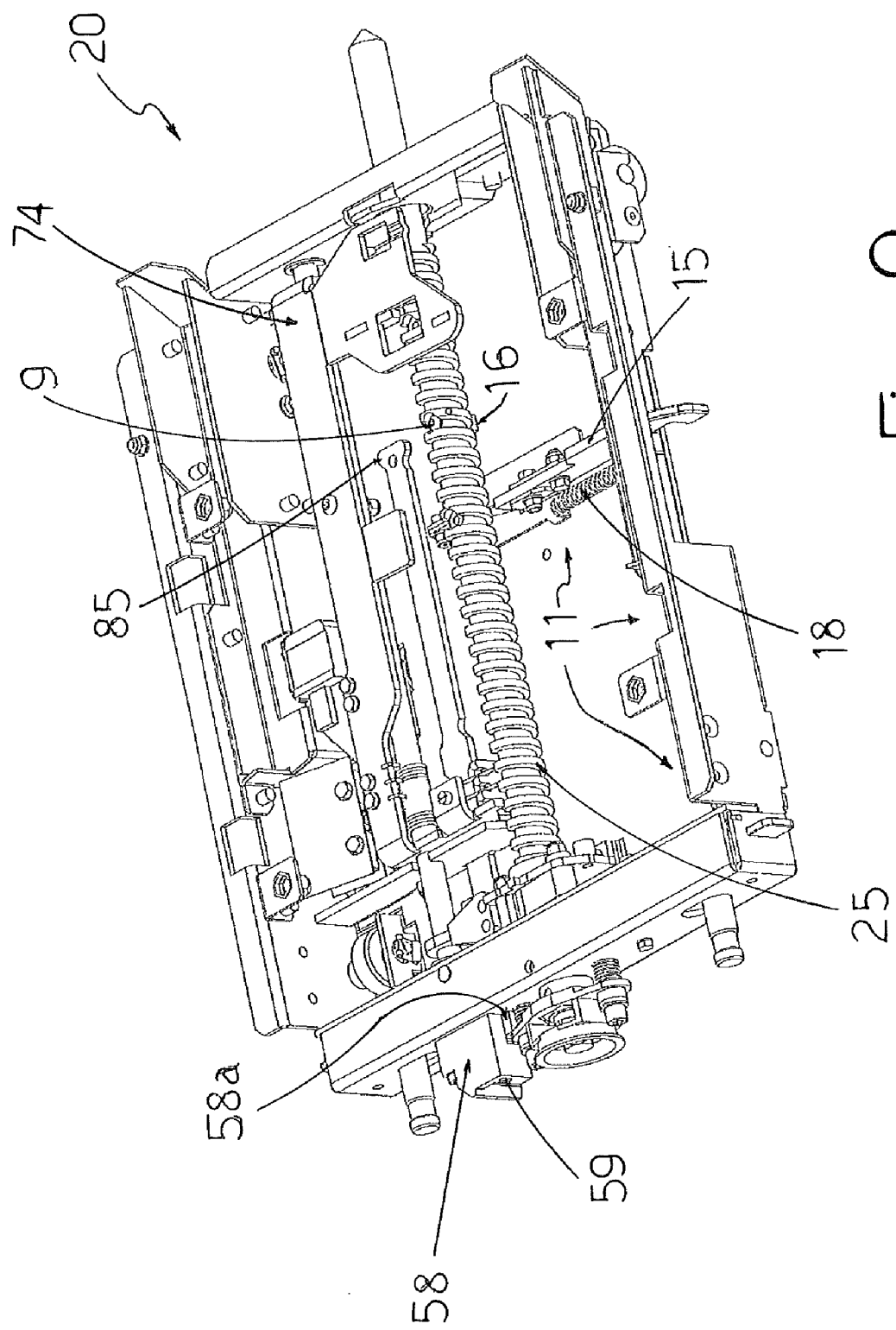
FIG. 9 is a perspective view illustrating the truck and some components of the stopping mechanism in a position corresponding to that of FIG. 4.
Figure 10:
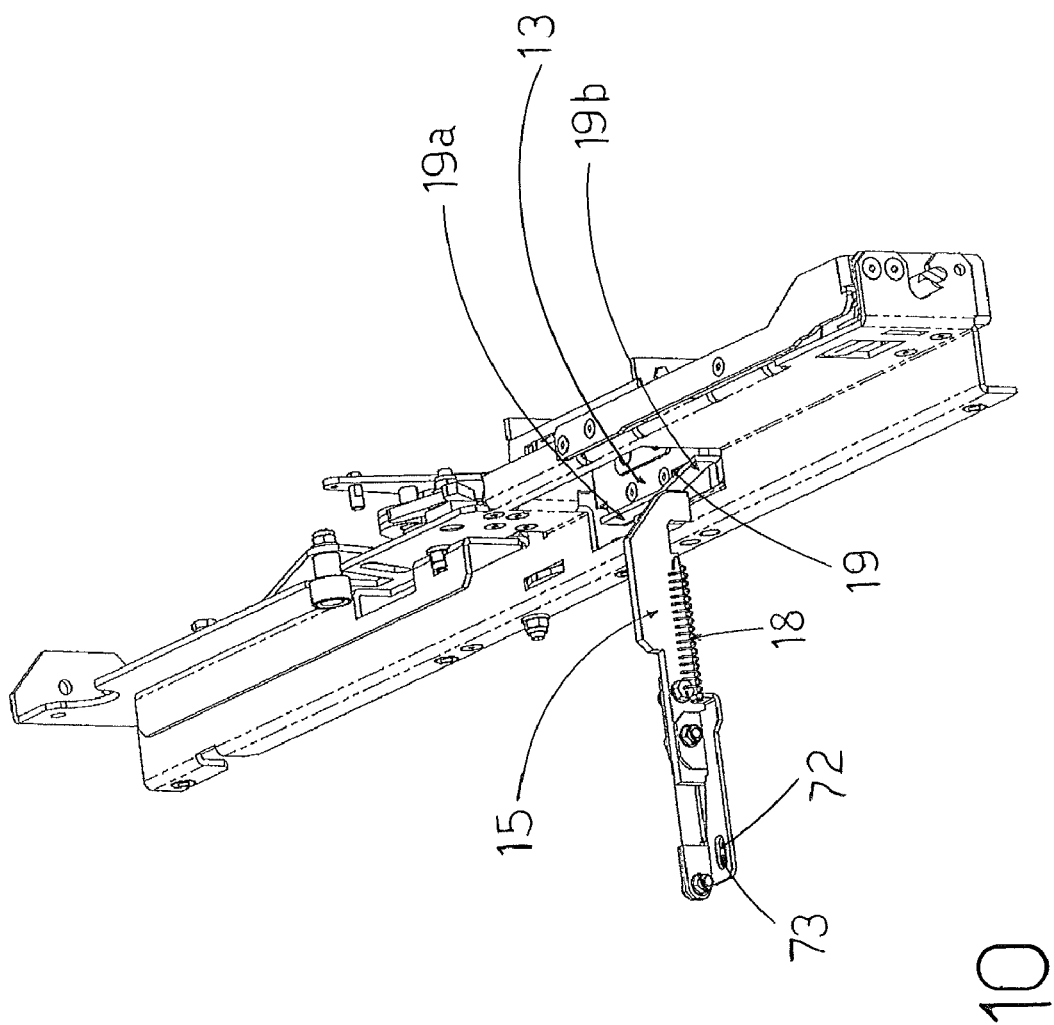
FIGS. 10-12 are perspective views showing a possible embodiment of some components of the stopping mechanism.
Figure 11:
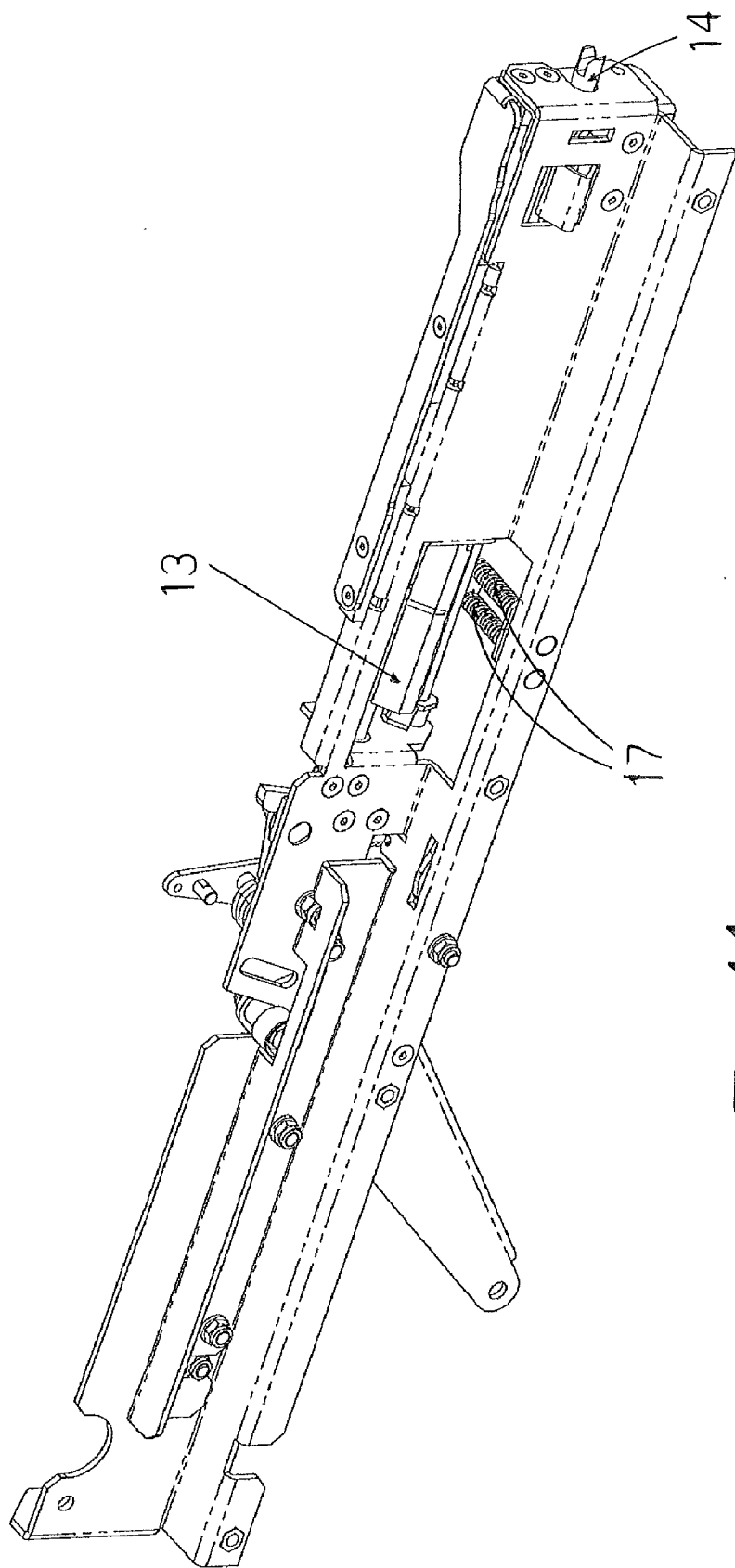
Figure 14:
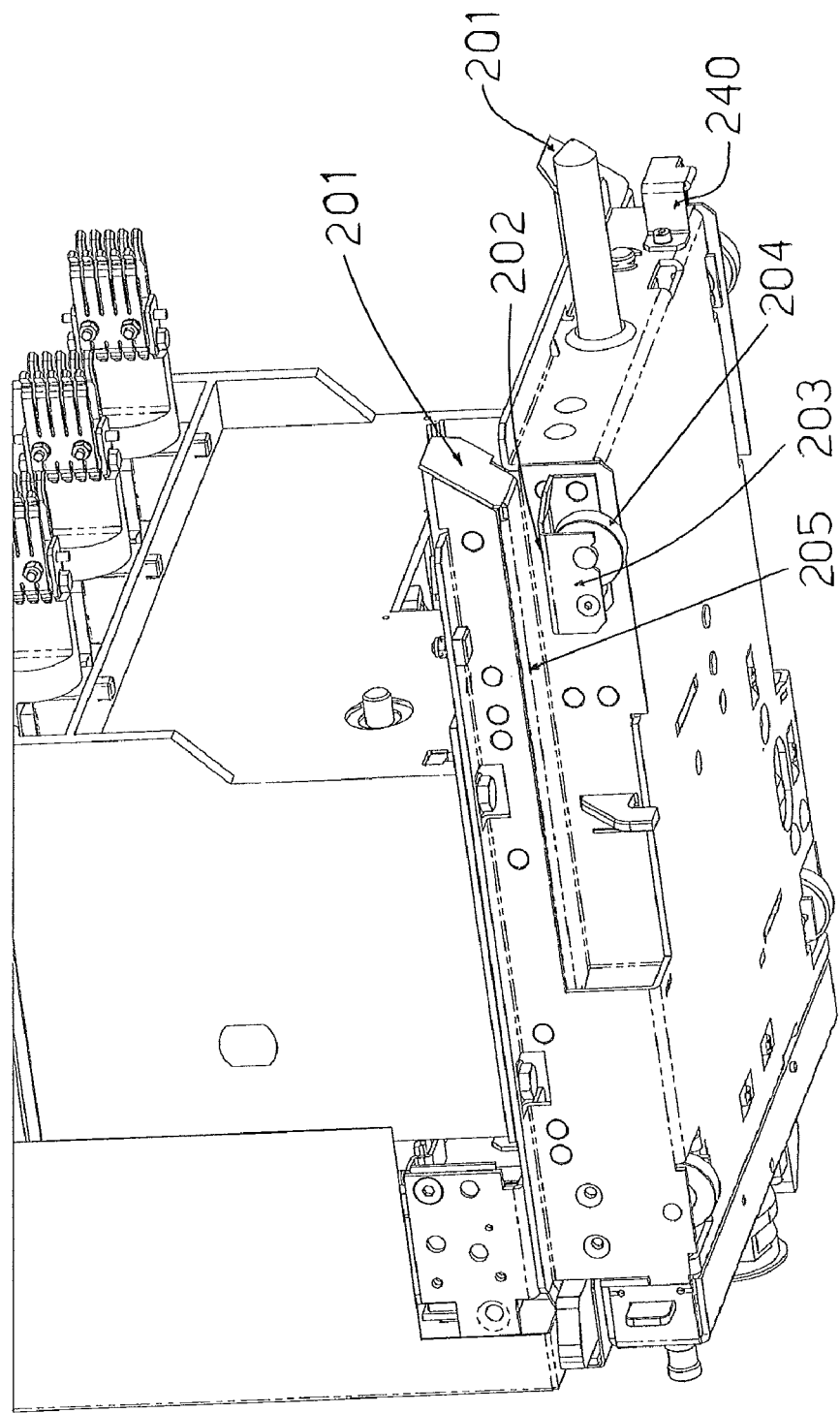
FIG. 14 is a perspective view of the truck used in the switchgear according to the invention seen from the bottom part.

A possible embodiment of a truck 20 according to the invention is illustrated in different positions in FIGS. 7-9. In the example shown, the truck 20 comprises for instance a movable drawer-shaped body featuring, amongst the others, a pair of truck lateral plates 21, a base plate 22, a front transverse plate 23 and a back transverse plate 24; a protruding body 240 (see esp. FIG. 14) is operatively connected to the back plate 24, e.g. screwed there to at the external side.

The drawer-shaped body can be formed by a single metallic plate suitably folded or can comprise various pieces assembled together.

In the embodiment illustrated, the truck lateral plates 21 have a substantially L-shaped configuration (seen in cross-section) wherein one side 21a of the L-shaped configuration protrudes, at the upper part, towards the external side of the drawer-shaped body itself.

At least one of the lateral plates 21 is provided with at least one protuberance; in the embodiment illustrated, a protuberance associated to a corresponding lateral plate 21 is constituted for example by the head, e.g. square-shaped, of a screw 26 which is fixed on the side 21a; alternatively a separate nut connected to a screw can be used as a protuberance 26, or such a protuberance 26 can be constituted by a portion suitably configured of the plate 21 itself.

Further, the truck 20 comprises a worm screw 25 which is connected to the drawer-shaped body; the worm screw 25 passes through a cross member 8 and enters a through hole 6 of a cylindrical body 27 which is movably coupled to the cross member 8 itself; between the cross member 8 and the cylindrical body 27 there is provided at least one spring 28, e.g. in the embodiment illustrated two springs. The cross member 8 is suitable to be removably connected inside the compartment 2 at the front part thereof, e.g. in a snap-fit manner through two movable inserts 8a, with the drawer-shaped body which is movable relative to the cross member 8 itself (and to the compartment 2 as well).

A couple of side truck guide plates or flanges 29 are fixed inside the compartment 2 and are suitable to be operatively coupled with the truck lateral plates 21 so as to allow the movable drawer-shaped body of the truck 20 to slide relative to the flanges 29.

The switchgear 100 according to the invention further comprises an earthing switch which is mounted inside the compartment 2 and is indicated in the relevant figures by the global reference 30.

Figure 5:
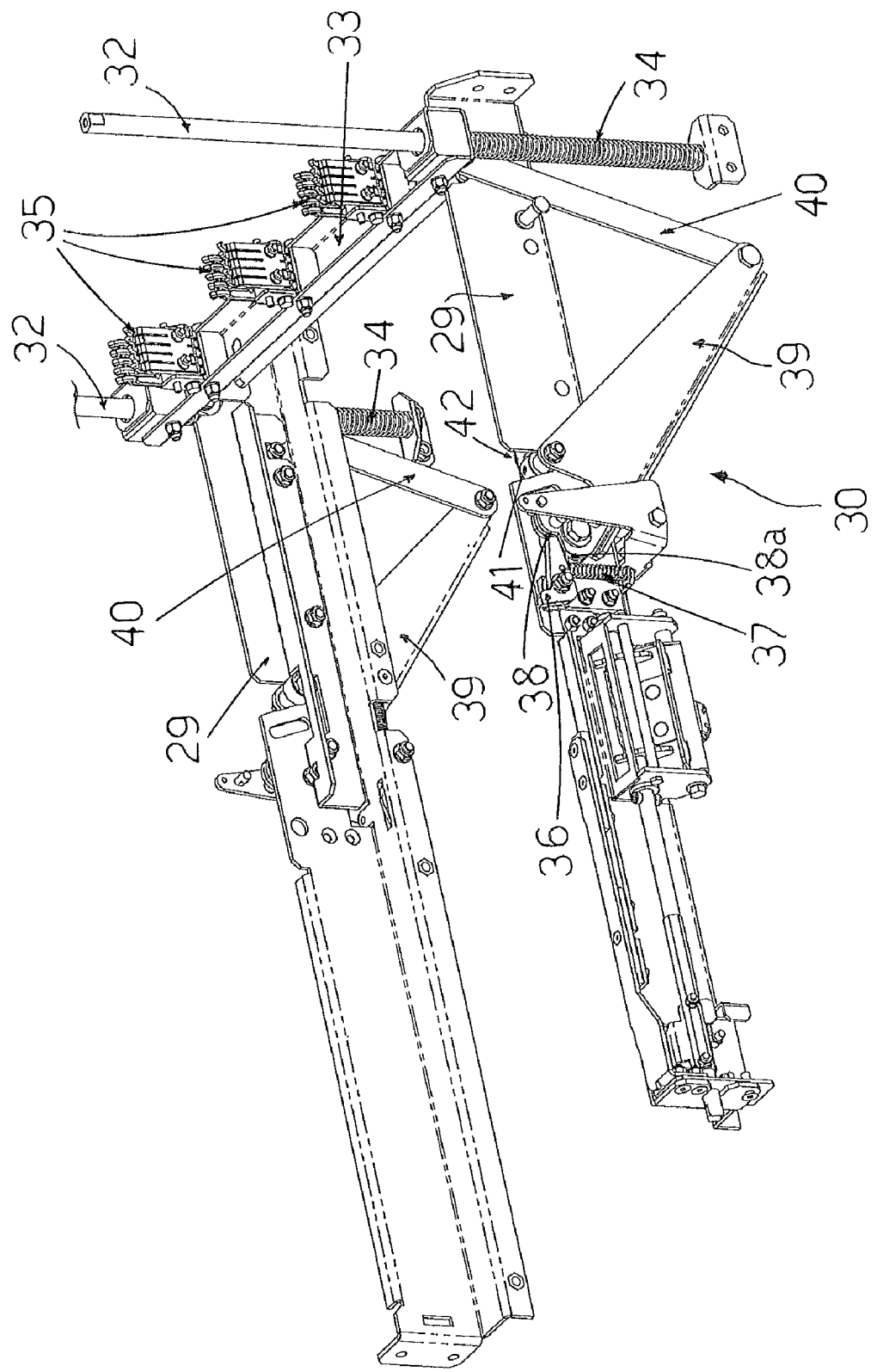
FIGS. 5-6 are perspective view illustrating the earthing switch in two different positions.
Figure 6:
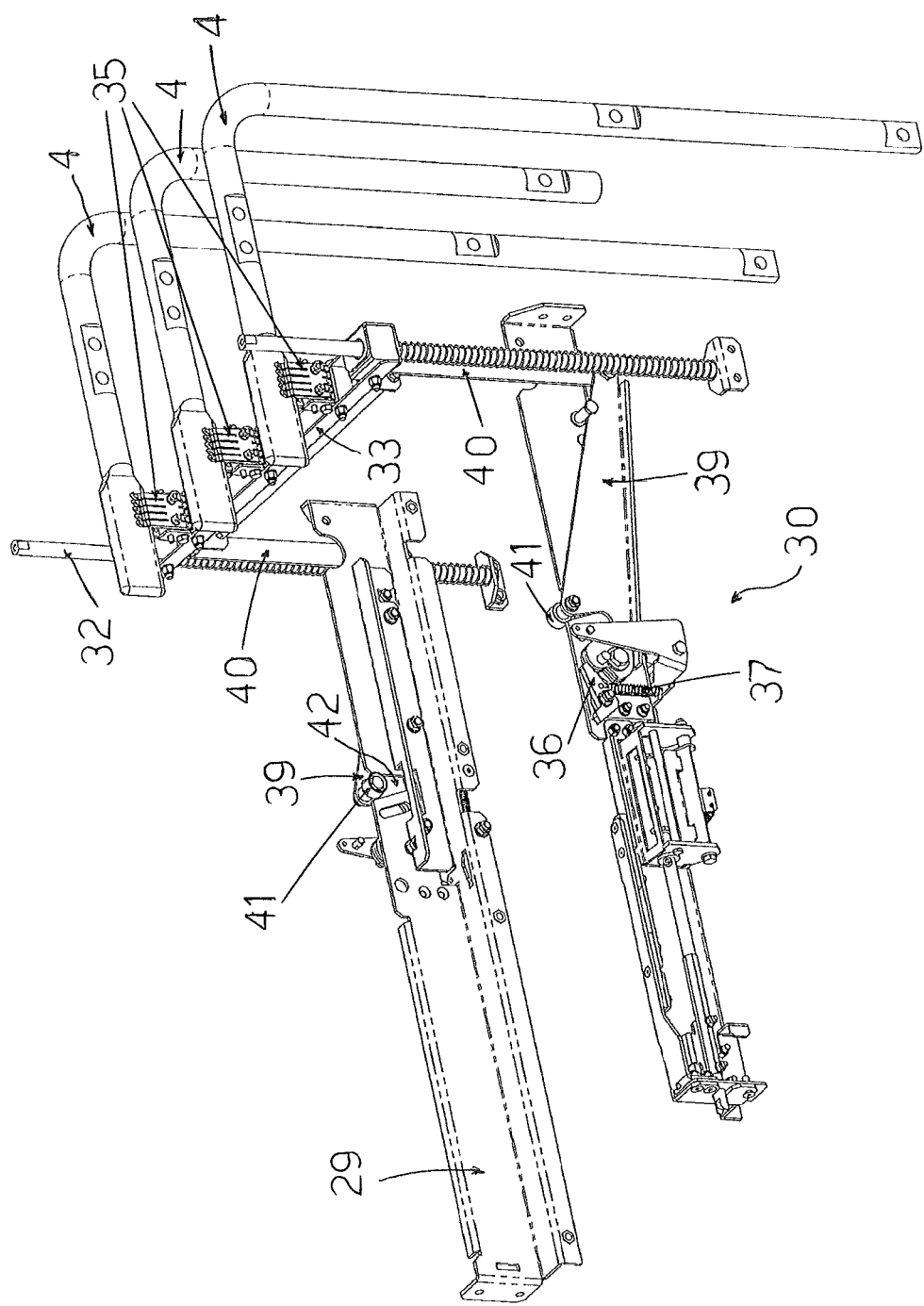

In the embodiment illustrated in more details in FIGS. 5-6, the earthing switch 30 preferably comprises two rods 32 which are connected to each other by a transverse plate 33; the transverse plate 33 is mounted sliding on the rods 32 and is subject to a pushing action of two springs 34 each mounted around a corresponding rod 32. A plurality of contacts 35 are mounted on the transverse plate 33 for connecting to earth (ground potential) the plurality of load supplying electrical conductors 4.

Figure 15:
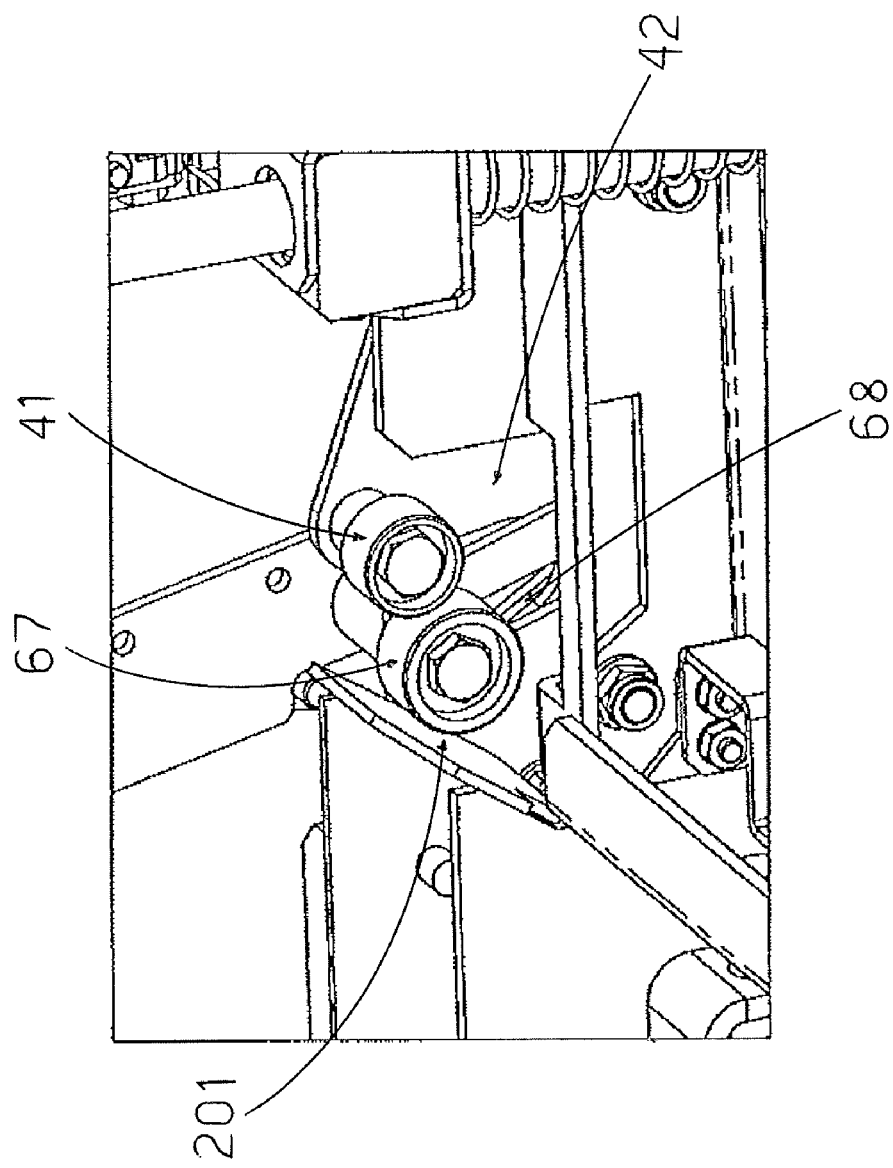
FIG. 15 is a view showing a particular of the switchgear according to the invention.

According to this embodiment, the earthing switch 30 comprises also at least one pawl 36 which is fixed to one of the side flanges 29; the pawl 36 is coupled to a spring 37 and is operatively associated to a corresponding recess 38. The recess 38 is provided on a lever 39 which is operatively connected to the transverse plate 33 by means of a connecting rod 40. Further, the earthing switch 30 comprises at least one roller 41 (see esp. FIG. 15) which is inserted into an associated recess 42 provided on the corresponding side flange 29; preferably there are two rollers 41 each of which is inserted into an associated recess 42 provided on a corresponding side flange 29. Each roller 41 is operatively connected to a corresponding lever 39 and is suitable to interact with the truck 20 for the scope and in the manner which will be described in more details in the following description.

According to the applications, it is possible to have only one pawl 36 attached to one of the side flanges 29 as above described, or both guide flanges 29 can be provided each with a corresponding pawl 36, while the remaining parts above described, e.g. the lever 39 with the recess 38 and the connecting rod 40 are replicated on both sides; as a consequence, it is also possible to have only one protuberance 26 provided on one of the truck lateral plates 21, or both truck lateral plates 21 can be provided each with a corresponding protuberance 26.

Figure 16:
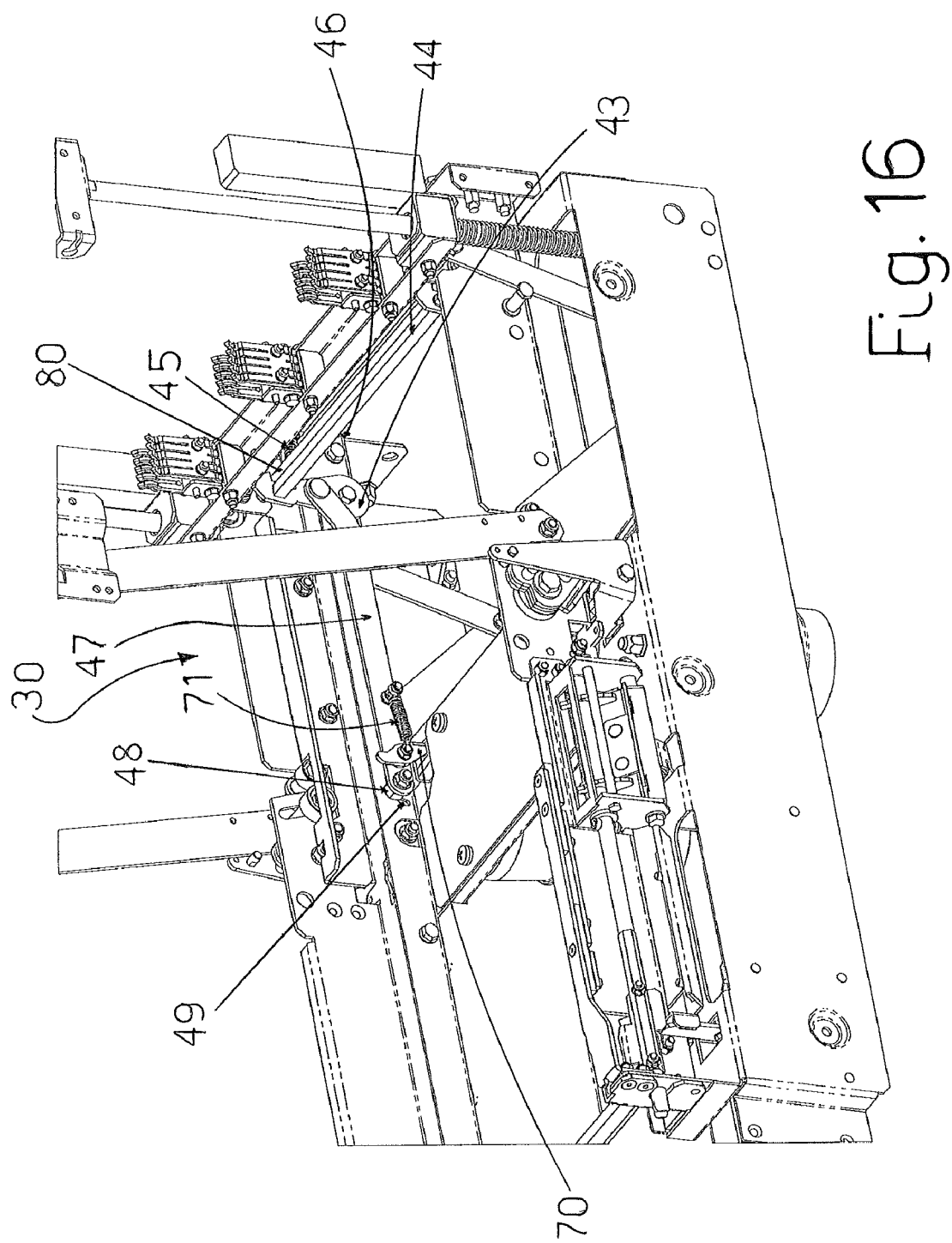
FIGS. 16-17 illustrate some components of the earthing switch according to a further embodiment.
Figure 17:
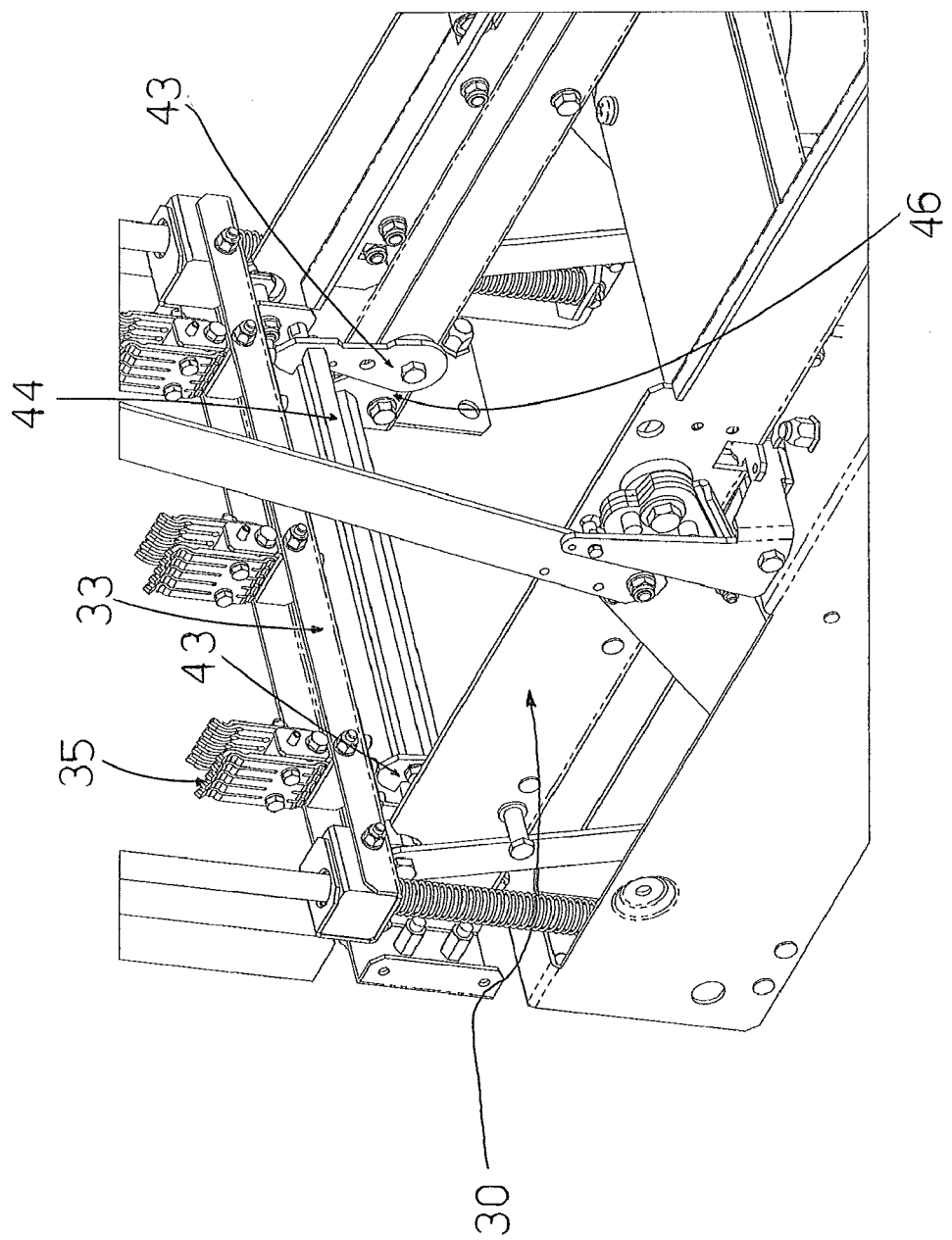

According to a second embodiment illustrated in more details in FIGS. 16-17, the earthing switch 30 comprises at least one hook 43, preferably a couple of hooks 43 which are connected to each other by means of a transverse bar 44; the hooks 43 are suitable to engage with/disengage from a transverse bar 80 which is operatively coupled to the transverse plate 33, and each hook 43 is movably connected to a plate 46 which is fixed into the compartment 2.

Further, the earthing switch 30 comprises a shaped rod or lever 47 which is connected at one end to a first hook 43, which first hook 43 is associated with a spring 45; if desired, also the other hook 43 can be associated to a corresponding spring 45.

The rod 47 is coupled at its other end to a screw-nut assembly 48 which is coupled to a curved slot 49 provided on the plate 46, in such a way to allow the rod 47 to move inside the slot 49 itself; clearly, the rod 47 can be coupled movable relative to the plate 46 in other different ways.

A further shaped lever 70 is pivotally connected to the rod 47 for instance at a point close to the screw-nut system assembly 48; a spring 71 has one end coupled to the lever 70 and another end 71 connected to the rod 47.

In this second embodiment the use of any pawl 36, as well as of the associated protuberance 26 can be prevented.

The earthing switch 30 is movable between a first position wherein each of its contacts 35 is electrically separated from the corresponding load supplying electrical conductor 4 (FIGS. 2 and 5) and a second position (grounding or earth connection) wherein each contact 35 is electrically connected to a corresponding electrical conductor 4 (FIGS. 4 and 6); in this second position the conductors 4 are connected to earth (i.e. to ground potential).

Advantageously, the earthing switch 30 is actuated to move between the first position and the second position by the movement of the truck 20 when the truck 20 moves between the connected position and the withdrawn position.

According to a particularly preferred embodiment, the movable truck 20 has a shaped body adapted for directly actuating the earthing switch 30 when moving between the connected position and the withdrawn position.

Alternatively, the truck 20 can actuate indirectly the earthing switch 30 when moving between the connected position and the withdrawn position, e.g. the truck 20 can interact with another element or unit which in turn triggers the movement of the earthing switch 30.

Preferably, the switchgear 100 according to the invention comprises a mechanism, indicated in the relevant figures by the overall reference 11, adapted for stopping the switching device 10 (and the truck as 20 well) in a position intermediate (hereinafter referred to as the "isolated position") between the connected position and the withdrawn position.

As illustrated in FIGS. 9-12, the stopping mechanism 11 preferably comprises a movable plate or flap 13 which is provided along the body of one of the side guide flanges 29; the movable flap 13 is associated to at least one spring 17 and is operatively coupled to and moved by an actuation knob 12 through a spindle 14. Further, the stopping mechanism 11 comprises an element 15, e.g. a hook-shaped lever 15 which is associated to a spring 18; as illustrated, the lever 15 is positioned transversally with respect to the pair of truck lateral plates 21 and is connected at a first end to the base plate 22 in such a way that it can move, e.g. preferably slide relative thereto. As illustrated, the lever 15 is provided with one or more slots 72 into which a screw-nut assembly 73 can be coupled. The second end of the lever 15 is for instance hook-shaped and is adapted to interact with the movable flap 13 and in particular with a track-like portion 19 of the flap 13 itself; the track-like portion 19 comprises a first rectilinear part 19a which runs substantially parallel to the side flange 29, and a second part 19b which diverges towards the same side flange 29.

Figure 12:
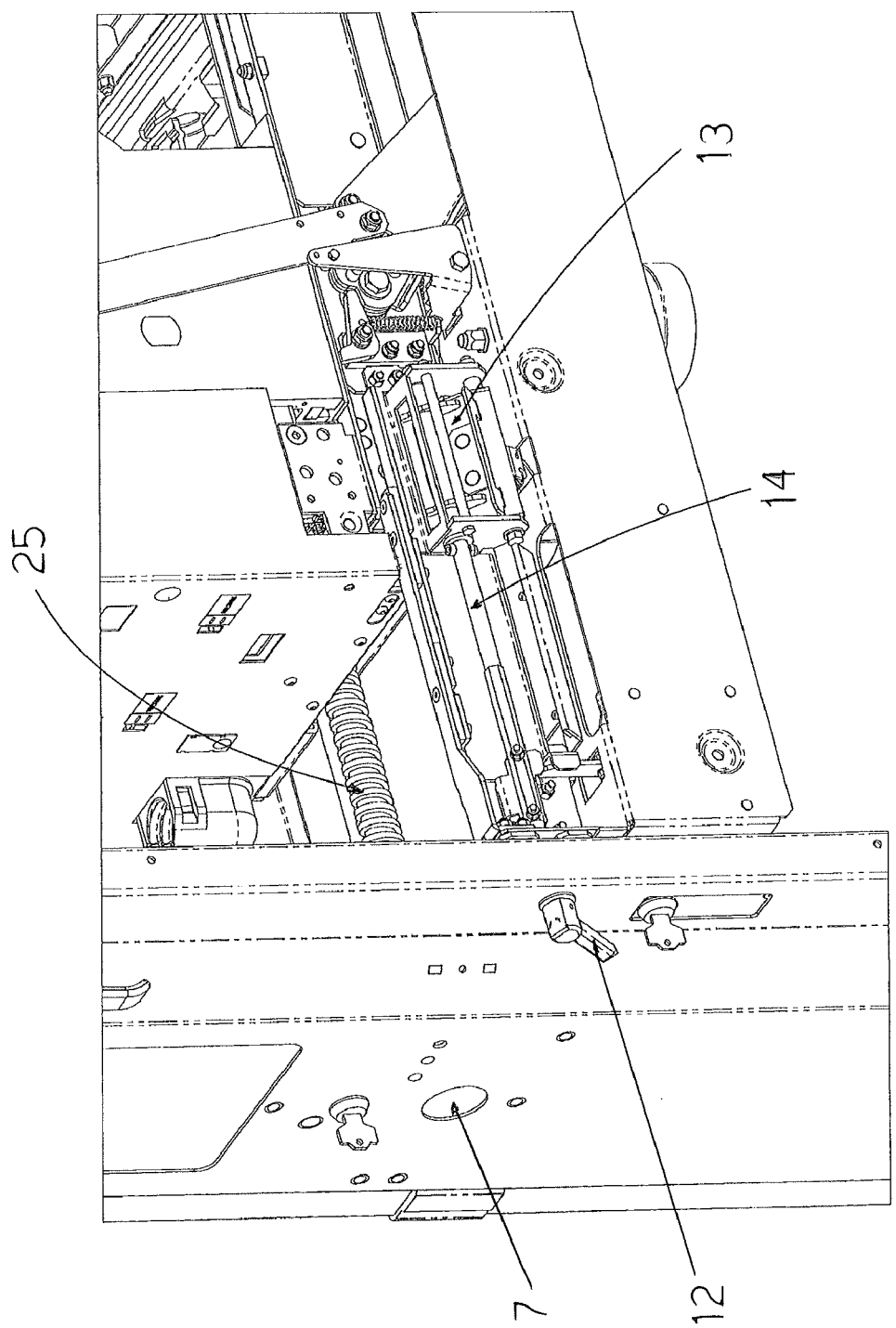

As illustrated in FIG. 12, the knob 12 is positioned on the door 3 outside the compartment 2 and can be actuated, e.g. by a user, so as to allow movement of the switching device 10 (and the truck 20 as well) from the intermediate position towards the connected position or towards the withdrawn position.

The stopping mechanism 11 comprises also a stopping element 16 which—according to a preferred embodiment—is connected to the worm screw 25 and is adapted for interacting with the body of the lever 15; for instance, in the embodiment illustrated the stopping element 16 comprises a nut 16, e.g. square shaped, coupled to a screw 9 which is inserted into a through hole provided on the worm screw 25.

Figure 13:
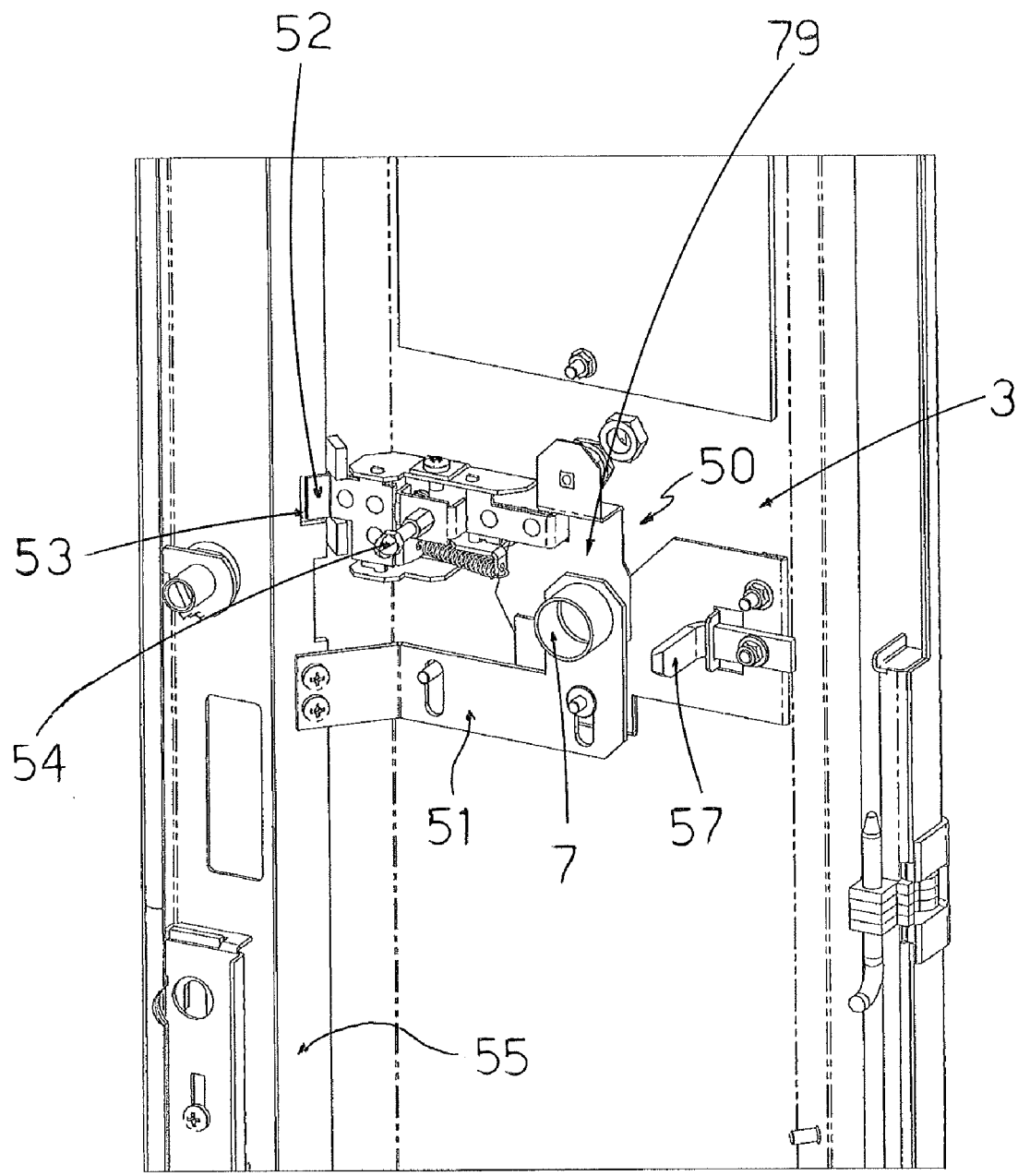
FIG. 13 is a perspective view showing a possible embodiment of a door locking mechanism used in the switchgear according to the invention.

Preferably, the switchgear 100 comprises a locking mechanism, globally indicated in FIG. 13 by the reference number 50, which is suitably adapted for keeping the door 3 closed when the truck 20 moves between the connected position and the withdrawn position (both senses).

As illustrated in FIG. 13, the locking mechanism 50 comprises a first part, e.g. a lever 51, which is mounted on the internal side of the door 3 and is provided with a through hole 7; the lever 51 is fixed at one end to a movable rod 55 which in turn is coupled to and moved by a handle 56 for closing/opening the door 3, in such a way that, when the door 3 is locked in the closed position, the hole 6 of the cylindrical element 27 inside which the worm screw 25 is entered, is aligned with the through hole 7 (and also a hole provided on the door 3). When the door 3 is closed and the assembly truck 20-switching device 10 is in the correct position inside the compartment 2, the holes are aligned each other; a well known tool such as a so called racking in/out lever can be entered from the outside of the door 3 so as to engage with the worm screw 25 and actuate it.

The locking mechanism 50 comprises a second part having a protuberance 52 suitable to engage with/disengage from a recess 53 provided on the rod 55, and a movable pin 54 which is suitable for mechanically interacting with the body of the switching device 10 so as to cause the protuberance 52 to disengage from/engage with the recess 53 and thus allowing/preventing opening of the door 3.

The locking mechanism 50 comprises also: a third part having an L-shaped pin 57 which is mounted on the internal side of the door 3 and is devised to enter into a recess 59 of a block 58 connected to the cross member 8; and a fourth part 79, e.g. a movable shutter element 79 which is suitable to be interposed between the holes 6 and 7 and can be actuated by means of an associated key 81 which is positioned on the front door 3. The block 58 has a lateral protrusion 58a which is interposed between the cylindrical element 27 and the cross bar 8; in this position, the cylindrical element 27 does not allow the racking in/out lever to correctly rotate the worm screw 25 from outside the closed door 3. Hence, the worm screw 25 is in a non-actuating position. When instead the assembly truck 20-switching device 10 is correctly positioned in the withdrawn position and the door 3 is closed, the L-shaped pin 57 engages the associated recess 59 and the protrusion 58a moves away from the interposed position and the cylindrical element 27 is free to move; by locking the door 3 through the handle 56 the rod 55 slides and allows alignment of the holes 6-7. By actuating the key 81, the shutter element 79 is moved away from the position interposed between the holes 6 and 7. In this position, from outside the closed door 3, the racking lever can enter the aligned holes 6-7 and correctly engage with the worm screw 25; in this condition the worm screw 25 is therefore in an actuating position, and hence the assembly truck 20-switching device 10 can be moved inside the compartment 2 towards the connected position.

The switchgear 100 comprises also a mechanism adapted for allowing electrical coupling of the main contacts of each phase of the switching device 10, and hence execution of tests, in particular when the switching device 10 is in the isolated position. Preferably this tests-allowing mechanism is operatively coupled to the truck 20 and, as indicated in FIGS. 7 and 9, comprises a micro-switch 78 mounted on the draw-like body of the truck 20, a first shaped lever 74 and a second lever 75 which are operatively coupled to each other and also operatively connected to the draw-like body of the truck 20; in particular the first lever 74 is pivotally coupled to a shaft 77 which is connected to the front transverse plate 23 and the back transverse plate 24 of the truck 20. The second lever 75 which is for instance shaped like a flat rod, comprises a first protuberance 76 which is suitable to interact mechanically with a portion of the first shaped lever 74 and to cause the actuation of the micro-switch 78 when the switching device 10 (and the truck 20 as well) is in the intermediate or isolated position illustrated in FIG. 3. In practice, when the truck 20 moves and reaches the isolated position, the protuberance 76 interacts with the first shaped lever 74 and causes it to rotate thus actuating, i.e. closing the micro-switch 78. In this way the vacuum contactor can be electrically closed (i.e. the main contacts of each phase are electrically coupled) by a user acting on any actuating device provided in or associated with the switchgear 100, e.g. a push-button; in this situation, it is possible in the isolated position to perform tests for verifying the correct operation of the various components.

Preferably, the second lever 75 comprises also a second protuberance 84 and a third protuberance 85 which interact with the lever 74 exactly in the same way as described for the protuberance 76 and cause actuation of the micro-switch 78 either in the withdrawn position or the connected position, respectively; in this way it is possible to perform tests also in these two end positions.

The switchgear 100 preferably comprises also a movable shutter 60 which is connected to the switching device 10 and is operatively coupled to the truck 20 in such a way that when the truck 20 moves from the connected position, and in particular from the isolated position to the withdrawn position (and vice versa), the shutter 60 moves from a non-operative or neutral position, illustrated in FIG. 2, where each phase of the switching device 10, and in particular each contact 121 is electrically connected to a corresponding power feeding conductor 5 (the shutter 60 is above them) and a second position where the shutter 60 is positioned between the various contacts 121 of the switching device 10 and the corresponding power feeding conductors 5 (and vice versa). In this way the shutter 60, when in the second position, electrically shields or segregates each phase of the switching device 10 from the corresponding power feeding cable 5.

In the embodiment illustrated, the shutter 60 is preferably mounted sliding on two rods 61 which are approximately aligned with the rods 32; further the shutter 60 is coupled to the earthing switch 30 through a connecting mechanism which comprises on each side (in the attached figures only one side is illustrated in more details for the sake of simplicity): a first element 62, e.g. a rod, which is connected at one end to the shutter 60 and at a second end to a second element 63 (e.g. another rod) at the pivot point 64; the second element 63 has a second end which is connected at pivot point 66. This connecting mechanism comprises also a third element 65, e.g. a further rod, which has also one end connected to the pivot point 66 and a second end which is coupled with a roller 67. The roller 67 is inserted movable into a recess 68 of the flange 29 and is suitable to operatively interact with the truck 20, and in particular with the associated inclined surface 201 provided on the body of the truck 20.

A shaped element 82 is connected at fulcrum point 83 on the internal side of the compartment 2 in such a way to allow movement of the described connecting mechanism and parts operatively connected there to relative to the compartment 2 itself; the shaped element 82 has a window 86 inside which the pivot point 66 can move.

The operations of the switchgear 100 according to the invention will be now described starting from the connected position shown in FIG. 2, wherein the switching device 10 is electrically connected in input to the power feeding conductors 5 (each contact 121 is connected to a corresponding conductor 5) and in output to the load supplying conductors 4 (each contact 111 is connected to a corresponding conductor 4); the door 3 is locked in the closed position thanks to the locking mechanism 50, and in particular to the protuberance 52 which is inserted into the recess 53 and prevents moving the door handle 56.

In this position, with the switching device 10 closed (i.e. the main contacts of each phase of the contactor 10 are electrically connected to each other), electric power flows from a source line through the power feeding conductors 5 and then passes from the contacts 121 through the fuses 120; then, through the contacts 111, electric power flows from the vacuum contactor 110 to the conductors 4 which supply a load, typically an electric motor (not shown) in case of an MCC.

When for any reason it is necessary to withdraw the switching device 10 from the operating position depicted in FIG. 2 and may be even extract it from the compartment 2 (so called racking out sequence or operation), the switching device 10, and in particular the vacuum contactor shown, is open (or switched off—i.e. the main contacts of each phase are electrically separated), for example by a user.

In this condition, while the door 3 is still locked in the closed position by the mechanism 50, the racking in/out lever is entered from the outside of the door 3 into the aligned holes 6-7 so as to engage with the worm screw 25. Then, by rotating the racking lever, the worm screw 25 rotates and causes the assembly truck 20-switching device 10 to start sliding towards the door 3. In this movement, each contact 121 separates from the corresponding conductor 5 as well as each contact 111 separates from a corresponding conductor 4. While continuing to rotate the worm screw 25, the assembly truck 20-switching device 10 can freely slide towards the door 3, until the protuberance 16 hits the hook-shaped lever 15 thus stopping the switching device 10 (as well as the truck 20) in the isolated position illustrated in FIG. 3. During the movement of the assembly truck 20-switching device 10 from the connected position to the isolated position, the earthing switch 30 remains substantially still in its initial (first) position; also the shutter 60 remains substantially still in its initial (neutral or non operative) position.

Further, as previously described, the interaction between the protuberance 76 and the rod 74 causes the actuation of the micro-switch-78 thereby giving the possibility to electrically close the main contacts of each phase of the vacuum contactor. In this way it is advantageously possible to execute some tests in the isolated position, for example to verify that the contactor is working properly.

After executing the desired tests, if any, and re-opening the main contacts, while the door 3 is still locked in the closed position, a user can voluntarily decide to continue the operation by rotating the knob 12 thus causing the rotation of the spindle 14 which in turn rotates the flap 13. The rotation of the flap 13 pushes the lever 15 which slides of an amount sufficient to offer a free space to the protuberance 16 and let it further proceed.

By continuing to rotate the worm screw 25, the assembly truck 20-switching device 10 slides towards the door 3.

In this movement, according to a first embodiment (see particular details in FIGS. 5-6), each truck lateral plate 21 continues to slide relative to the associated flange 29 thus bringing the protuberance 26 to interact with the corresponding pawl 36 and force it to disengage from the associated recess 38.

In this way, the earthing switch 30 is triggered and the transverse plate 33 is free to slide along the rods 32 under the action of the two springs 34 which release their energy. As a consequence, each contact 35 is brought into electrical connection with a corresponding conductor 4 thus connecting it to ground potential (see FIG. 6).

Likewise, in a second embodiment illustrated in FIGS. 16-17, it is the shaped portion 240 of the truck 20 which interacts with the lever 70, draws it and thus causes the rod 47 to move into the slot 49 downwardly; this movement finally results in disengaging the hooks 43 from the bar 80; therefore, also in this embodiment the earthing switch 30 is triggered and the transverse plate 33 is free to slide along the rods 32 under the action of the two springs 34 which release their energy thus bringing each contact 35 into electrical connection with a corresponding conductor 4 and connecting it to ground potential.

Meanwhile the assembly truck 20-switching device 10 starts to move from the isolated position towards the withdrawn position, the roller 41 moves towards the upper part of the recess 42; the roller 67 is free from the constraint previously exerted on it by the truck 20 and moves towards the upper part of the recess 68. As a consequence, the shutter 60, under the action of its weight, moves from the first neutral position (FIG. 2) to the second position (FIG. 4) where it is positioned between and electrically shields or segregates each phase of the switching device 10, and in particular each contact 121 from the corresponding power feeding conductor 5.

Advantageously, the movable shutter 60 is operatively coupled to the earthing switch 30 (and the truck 20 as well) so as the contacts 35 and the shutter 60 move along the same direction, e.g. substantially vertical, and opposite senses to each other.

At the end of the operation, the assembly truck 20-switching device 10 reaches the withdrawn position illustrated in FIG. 4. In this position a part of the switching device 10, e.g. the casing 112 presses the head of the movable pin 54 which in turn causes the protuberance 52 to disengage from the recess 53.

Only in this position the rod 55 is free to move, and the door handle 56 can be actuated thus allowing opening the door 3; if desired, the assembly truck 20-switching device 10 can be extracted from the compartment 2, e.g. for inspection, maintenance or replacement of parts.

Vice-versa, when it is necessary to bring into operation the switching device 10 (the so-called racking in sequence or operation), the assembly truck 20-switching device 10 is positioned inside the compartment 2 at the front part thereof; by closing the door the protrusion 58a, as previously described, moves away from the cylindrical element 27; by actuating the handle 56 the protuberance 52 engages with the recess 53 and locks the rod 55. In this position, from outside the closed door 3, the racking lever can enter the aligned holes 7-6 and correctly engage with the worm screw 25.

By rotating the worm screw 25 with the racking in/out lever (in this sequence the worm screw 25 rotates in the opposite sense with respect to that when moving from the connected position towards the withdrawn position) the assembly truck 20-switching device 10 slides towards the back part of the compartment 2 until the protuberance 16 hits again the hook-shaped lever 15.

During this movement from the withdrawn position towards the isolated position, the truck 20 operatively interacts with the rollers 67 and 41. In particular, the inclined surface 201 of the truck 20 (preferably defined on both sides of the truck 20 as illustrated in FIG. 15) causes the rollers 67 and 41 to move downwardly into the respective recesses 68 and 42 and substantially parallel to a channel-like portion 202 defined between a cover 203 of the truck rear wheel 204 and a shaped surface 205 of the truck lateral plate 21.

The action of the inclined surfaces 201 causes the movement of the lever(s) 39 and of the connection rod(s) 40 which return towards the position illustrated in FIG. 2.

In particular, according to the first embodiment (FIGS. 5-6), the rotation of the lever(s) 39 causes the transverse plate 33 (with the contacts 35 mounted thereon) to slide downwardly along the rods 32 and to reach its initial position; during the rotation of the lever(s) 39, the pawl 36 engages with the associated recess 38 under the action the spring 37; as a consequence, while the assembly truck 20-switching device 10 further slides and reaches the isolated position, the earthing switch 30 is again in its initial position (see FIG. 3).

Likewise, in the embodiment illustrated in FIGS. 16-17, the rotation of the lever(s) 39 and the movement of the associated rod(s) 40 causes the transverse plate 33 (with the contacts 35 mounted thereon), as well as the transverse bar 80, to slide downwardly along the rods 32 until the hooks 43 engage the bar 80; therefore also in this case while the assembly truck 20-switching device 10 slides and reaches the isolated position, the earthing switch 30 is again in its initial position (see FIG. 3).

Meanwhile, (in both embodiments) the movement of the truck 20 (and the switching device 10 as well), through the various components 62, 63, 65 of the previously described connecting mechanism causes the shutter 60 to move from the shielding position to the neutral position illustrated also in FIG. 3.

In this position (FIG. 3) the assembly truck 20-switching device 10 is stopped in the isolated position and thanks to the interaction between the protuberance 76 and the rod 74 the micro-switch-78 can be again actuated thereby giving the possibility to electrically close the main contacts of each phase of the vacuum contactor and perform tests in the isolated position, as previously described.

Then, after re-opening the main contacts, when a user actuates the knob 12 from outside the door 3, the flap 13 rotates and the lever 15 under the action of the associated spring moves of an amount sufficient to let the protuberance 16 pass beyond it.

In both embodiments, by continuing to rotate the worm screw 25, the assembly truck 20-switching device 10 continues to slide until it reaches the connected position; at the end of the movement the various components are in the position shown in FIG. 2, i.e. the earthing switch 30 is in the first position wherein the contacts 35 are separated from the corresponding conductors 4, the contacts 121 are each connected to a corresponding power feeding conductor 5, and each contact 111 is connected to a corresponding load supplying contact 4. The shutter 60 is positioned above the contacts 121 connected to the corresponding power feeding conductors 4. The rollers are kept in the desired position by the truck 20.

It is clear from the above that the switchgear 100 of the present invention has a number of advantages with respect to switchgear of known type having the same functionalities. In particular, the fact that the earthing switch 30 is directly actuated by the movement of the truck 20 allows eliminating the need of dedicated operating mechanisms for actuating the earthing switch and therefore executing the grounding operations. This allows reducing the number of components and the manufacturing, installation and maintenance costs.

Similar results and advantages are offered by the fact that the movement of the truck 20 also directly actuates the movement of the shutter 60.

In addition, the fact that the switching device 10 is stopped in the intermediate position and requires a voluntary intervention of a user in order to further proceed, increases the safety of the grounding operations. Indeed, the block in the intermediate position is like a warning for a user and advantageously introduces a possible time delay, in particular when the switching device 10 is moved from the connected position towards the withdrawn one, and the earthing switch 30 has to be closed; in fact, if the earthing switch 30 is closed too fast, it is possible that the motor is still rotating, an early connection to ground of the conductors 4 may result in short-circuiting the phases of the motor itself. Finally, the possibility to move the assembly truck 20-switching device 10 between the connected position and the withdrawn position with the door 3 locked in the closed position substantially increases the safety of operations for users.

The switchgear thus conceived may undergo numerous modifications and come in several variants, all falling within the scope of the inventive concept as defined by the appended claims; for example, the various components of the truck 20 or of the earthing switch 30, or of the locking mechanism 50, or of the stopping mechanism 11 may be differently shaped or may be constituted by a different number of parts; the protuberance 26 (as well as other components) can be provided on both sides of the truck 20 or only on one side, or can be differently shaped, or formed directly by a shaped surface of the truck lateral plate 21 itself, et cetera.

What is claimed is:

1. An electric switchgear comprising:
   a casing having at least one compartment provided with a door;
   a plurality of electrical conductors adapted to be connected to a load;
   a plurality of power feeding conductors;
   a multi-phase switching device which is mounted on a truck movable inside said compartment between a connected position, wherein each phase of said multiphase switching device is electrically connected to a corresponding electrical conductor and a corresponding power feeding conductor, and a withdrawn position, wherein each phase of said multi-phase switching device is electrically separated from the corresponding electrical conductor and power corresponding feeding conductor; and
   an earthing switch comprising a plurality of contacts for connecting said plurality of electrical conductors to earth, said earthing switch being movable between a first position, wherein each contact of said plurality of contacts is electrically connected to a corresponding electrical conductor, and a second position, wherein each contact of said plurality of contacts is electrically separated from the corresponding electrical conductor, wherein said earthing switch is actuated to move between said first and second positions by the movement of said truck between said connected position and said withdrawn position.

2. The switchgear according to claim 1, wherein said movable truck is adapted for directly actuating said earthing switch when moving between said connected position and said withdrawn position.

3. The switchgear according to claim 1, further comprising a mechanism adapted for stopping said switching device in a position intermediate between said connected position and said withdrawn position.

4. The switchgear according to claim 1, further comprising a locking mechanism adapted for keeping said door closed when said truck is moving between said connected position and said withdrawn position.

5. The switchgear according to claim 1, wherein each phase of said multi-phase switching device comprises a plurality of main contacts which can be electrically coupled to or separated from each other, and wherein said switchgear further comprises a mechanism for allowing electrical coupling of said plurality of main contacts when the multi-phase switching device is in the intermediate position.

6. The switchgear according to claim 1, further comprising:
   a shutter, which is movable between a first position, wherein each phase of said multi-phase switching device is electrically connected to a corresponding power feeding conductor, and a second position, wherein said shutter is positioned between and electrically shields each phase of said multi-phase switching device from the corresponding power feeding conductor; and wherein said shutter is actuated to move between said first and second positions by the movement of said truck between said connected position and said withdrawn position.

7. The switchgear according to claim 1, wherein said truck comprises at least one portion which is adapted for interacting with a corresponding portion of said earthing switch and cause said earthing switch to move between said first and second positions when said truck moves between said connected position and said withdrawn position.

8. The switchgear according to claim 7 wherein said truck comprises:
   a movable drawer-shaped body having a pair of truck lateral plates at least one of which is provided with a protuberance;
   a cross member which is suitable to be removably connected inside the compartment at the front part thereof, said cross member being coupled with a cylindrical element having a through hole, wherein at least one spring is positioned between and connected to said cross member and said cylindrical element; and
   a worm screw which is connected to said drawer-shaped body and has one end which passes through said cross member and is inserted into said through hole of the cylindrical element, said drawer-shaped body being moveable relative to said cross member.

9. The switchgear according to claim 8 wherein said earthing switch comprises a first lever provided with a first recess and at least one pawl operatively associated with said first recess, wherein said protuberance is adapted for interacting with said at least one pawl and forcing it to disengage from the associated first recess when the truck moves from said connected position towards said withdrawn position.

10. The switchgear according to claim 7 wherein said earthing switch comprises:
   at least one movable hook which is suitable to engage with/disengage from a transverse bar operatively coupled to said plurality of contacts;
   a first shaped lever which is connected at one end to said at least one movable hook and at a second end is coupled movable to a flange fixed into said compartment; and
   a second shaped lever which is pivotally connected to the first shaped lever; and
   wherein said truck has a shaped portion which is adapted for interacting with said second shaped lever and causing said first shaped lever to slide relative to said flange and said at least one movable hook to disengage from the transverse bar when the truck moves from said connected position towards said withdrawn position.

11. The switchgear according to claim 9, wherein said truck comprises at least one inclined surface which is suitable to interact with said first lever so as to allow said at least one pawl to engage with said associated first recess when the truck moves from said withdrawn position towards said connected position.

12. The switchgear according to claim 10, wherein said earthing switch comprises a first lever and said truck comprises at least one inclined surface which is suitable to interact with said first lever so as to cause said at least one movable hook to engage with the transverse bar when the truck moves from said withdrawn position towards said connected position.

13. The switchgear according to claim 3, wherein said stopping mechanism comprises:
   a knob which is positioned on said door outside said compartment for allowing movement of the switching device from said intermediate position towards said connected position or said withdrawn position, a movable flap which is operatively coupled to and moved by said knob through a spindle, and a hook-shaped lever which is adapted to mechanically interact with said movable flap; and
   a stopping element which is coupled to a worm screw provided on said truck and is adapted for interacting with said hook-shaped lever.

14. The switchgear according to claim 5, wherein said mechanism for allowing electrical coupling of said couple of main contacts comprise a micro-switch, a first shaped lever and a second shaped lever provided with at least one protuberance which is suitable to interact mechanically with the first shaped lever so as to cause actuation of said micro-switch.

15. The switchgear according to claim 8, wherein the switchgear further comprises a locking mechanism adapted for keeping said door closed when moving said truck between said connected position and said withdrawn position, said locking mechanism comprising:
   a first element mounted on the internal side of said door and provided with a through hole suitable to be aligned with said through hole of the cylindrical element so as to allow said worm screw to be operatively connected to a tool for moving said switching device between said connected position and said withdrawn position;
   a protuberance suitable to engage with/disengage from a second recess provided on a rod which is coupled to and moved by a handle for closing/opening said door, and a movable pin adapted for mechanically interacting with said multi-phase switching device so as to cause said protuberance to disengage from/engage with said second recess and allow/prevent opening of said door; and
   a block connected to said cross member, said block being provided with a third recess and a protrusion suitable to be interposed between said cylindrical element and said cross member, and an L-shaped pivot which is mounted on the internal side of said door and has one end suitable to enter into said third recess and allows moving said protrusion away from the position interposed between said cylindrical element and said cross member.

16. The switchgear according to claim 1, wherein the switchgear is a motor control center (MCC) for supplying power to an electric motor.

* * * * *